US012680621B2

(12) United States Patent
Davis et al.

(10) Patent No.: US 12,680,621 B2
(45) Date of Patent: Jul. 14, 2026

(54) PEIZOELECTRIC VALVE ASSEMBLY

(71) Applicant: Humphrey Products Company,
Kalamazoo, MI (US)

(72) Inventors: Scott Davis, Kalamazoo, MI (US);
Marc Larson, Kalamazoo, MI (US);
Todd Bordewyk, Hudsonville, MI (US)

(73) Assignee: Humphrey Products Company,
Kalamazoo, MI (US)

( * ) Notice: Subject to any disclaimer, the term of this
patent is extended or adjusted under 35
U.S.C. 154(b) by 0 days.

(21) Appl. No.: 18/649,298

(22) Filed: Apr. 29, 2024

(65) Prior Publication Data

US 2024/0360915 A1      Oct. 31, 2024

Related U.S. Application Data

(60) Provisional application No. 63/499,020, filed on Apr.
28, 2023.

(51) Int. Cl.
| | |
|---|---|
| *F16K 31/00* | (2006.01) |
| *F16K 27/02* | (2006.01) |
| *F16K 31/06* | (2006.01) |
| *F16K 31/524* | (2006.01) |
| *F16K 99/00* | (2006.01) |

(52) U.S. Cl.
CPC .......... *F16K 31/004* (2013.01); *F16K 27/029*
(2013.01); *F16K 31/005* (2013.01); *F16K
31/006* (2013.01); *F16K 31/0603* (2013.01);
*F16K 31/52416* (2013.01); *F16K 99/0048*
(2013.01)

(58) Field of Classification Search
CPC .... F16K 31/004; F16K 31/005; F16K 31/006;
F16K 31/0603; F16K 31/52416; F16K
27/029; F16K 99/0048
USPC ................................... 251/129.01; 137/487.5
See application file for complete search history.

(56) References Cited

U.S. PATENT DOCUMENTS

| | | | | | |
|---|---|---|---|---|---|
| 4,617,952 | A | * | 10/1986 | Fujiwara ................. | F15B 5/003 |
| | | | | | 137/625.45 |
| 5,628,411 | A | * | 5/1997 | Mills ..................... | F16K 31/005 |
| | | | | | 251/368 |
| 5,779,218 | A | * | 7/1998 | Kowanz ................. | F15B 5/003 |
| | | | | | 251/129.06 |
| 6,017,016 | A | * | 1/2000 | Jackson .................... | F15C 3/14 |
| | | | | | 251/357 |
| 6,024,340 | A | * | 2/2000 | Lazarus ................ | F16K 31/004 |
| | | | | | 310/365 |
| 6,164,621 | A | * | 12/2000 | Bouchard ............. | F16K 31/006 |
| | | | | | 251/129.06 |
| 6,173,744 | B1 | * | 1/2001 | Frisch ................... | F16K 31/006 |
| | | | | | 137/625.65 |

(Continued)

*Primary Examiner* — Minh Q Le

(74) *Attorney, Agent, or Firm* — Gardner, Linn, Burkhart
& Ondersma LLP

(57) ABSTRACT

A valve assembly comprising a housing having a cavity and
including a port forming an opening in the cavity, and a
piezoelectric assembly disposed at least partially in the
cavity. The piezoelectric assembly comprises an elongated
piezoelectric layer, a sealing pad, and an electrical contact.
The electrical contact is configured to receive a voltage
signal, and when the piezoelectric assembly receives the
voltage signal at the electrical contact the piezoelectric layer
deforms to cause the sealing pad to selectively seal or unseal
the port.

20 Claims, 14 Drawing Sheets

(56)        References Cited

U.S. PATENT DOCUMENTS

| | | | | |
|---|---|---|---|---|
| 6,499,509 | B2 * | 12/2002 | Berger | F15B 13/0438 |
| | | | | 137/596.17 |
| 2002/0008218 | A1 * | 1/2002 | Weinmann | F16K 31/006 |
| | | | | 251/357 |
| 2002/0059957 | A1 * | 5/2002 | Frisch | F16K 31/004 |
| | | | | 137/596.2 |
| 2003/0178074 | A1 * | 9/2003 | Itzhaky | F16K 31/006 |
| | | | | 137/625.65 |
| 2003/0222236 | A1 * | 12/2003 | Eberhardt | F16K 31/006 |
| | | | | 251/129.06 |
| 2004/0177890 | A1 * | 9/2004 | Weinmann | F16K 31/006 |
| | | | | 137/625.65 |
| 2012/0161045 | A1 * | 6/2012 | Lee | F16K 31/006 |
| | | | | 251/129.01 |
| 2015/0276081 | A1 * | 10/2015 | Im | F16K 31/005 |
| | | | | 251/129.01 |
| 2016/0018016 | A1 * | 1/2016 | Dankbaar | F16K 7/12 |
| | | | | 251/129.01 |
| 2016/0363231 | A1 * | 12/2016 | Yasumoto | H10N 30/02 |
| 2018/0298923 | A1 * | 10/2018 | Dickhoff | F16K 37/0033 |

* cited by examiner

PEIZOELECTRIC VALVE ASSEMBLY

CROSS REFERENCE TO RELATED APPLICATION

The present application claims priority benefit of U.S. provisional application Ser. No. 63/499,020 filed Apr. 28, 2023, which is hereby incorporated herein by reference in its entirety

BACKGROUND AND FIELD OF THE INVENTION

The present invention is directed to a valve assembly, and in particular to a piezoelectric actuated valve assembly.

SUMMARY OF THE INVENTION

The present invention provides a valve assembly that includes one or more piezoelectric assemblies for controlling flow through the valve assembly.

According to an aspect of the present invention, a piezoelectric actuated valve assembly comprises a housing having a cavity and including a port forming an opening in the cavity, with a piezoelectric assembly disposed at least partially in the cavity. The piezoelectric assembly comprises an elongated piezoelectric layer and comprises a sealing pad and an electrical contact disposed distally from the sealing pad. The electrical contact is configured to receive a voltage, and when the piezoelectric assembly receives a voltage at the electrical contact the piezoelectric layer deforms to cause the sealing pad to selectively seal or unseal the port.

In a particular embodiment the piezoelectric assembly includes first and second piezoelectric layers that are disposed on either side of a ground plate such that the ground plate is disposed between the first and second piezoelectric layers. In such an embodiment the piezoelectric assembly includes first and second electrical contacts that are coupled to the first and second piezoelectric layers, respectively. The piezoelectric assembly is configured to receive a voltage at either of the first or second electrical contacts, and when a voltage is applied to either the first or second electrical contacts the associated first or second piezoelectric layer deforms. For example, the piezoelectric layer is configured to contract when a voltage is applied to the electrical contact.

Still further, the piezoelectric assembly comprises a pair of opposed ends with the sealing pad disposed at one end and the electrical contact disposed at the opposite end. In particular embodiments the electrical contact comprises an electrical contact pad. Still further, the valve assembly may further include an electrical connector for providing voltage to the piezoelectric assembly at the electrical contact. In a particular embodiment the electrical connector includes a contact wire for connection with the electrical contact, such as a spring loaded contact wire for engagement with the electrical contact. The electrical contact of the piezoelectric assembly is configured to extend out of the cavity.

The valve assembly may further include a biasing member engaged with the piezoelectric assembly to provide a biasing force to said piezoelectric assembly, with the piezoelectric assembly configured to overcome the biasing force when it receives a voltage. The biasing member may be configured to bias the piezoelectric assembly into a normally closed position in which said sealing pad is engaged with a seat at said port, and may comprise a spring, such as a leaf or a compression spring.

The valve assembly may further include a manifold attached to the housing. Still further, a valve assembly may be configured to include two of the above discussed valve assemblies that are joined with a manifold. Such a combination of two valve assemblies may operate as a three-way valve.

For example, such a valve assembly may include a first and a second housing joined together with a manifold, where flow through the first and second housings is controlled via respective piezoelectric assemblies. The first housing comprises a first cavity and includes a first port forming an opening in the first cavity, a first piezoelectric assembly disposed at least partially in the first cavity, where the first piezoelectric assembly comprises an elongated piezoelectric layer, a sealing pad, and an electrical contact disposed distally from the sealing pad. The electrical contact is configured to receive a voltage such that the piezoelectric layer deforms to cause the sealing pad to selectively seal or unseal the first port. Similarly, the second housing comprises a second cavity and includes a second port forming an opening in the second cavity. A second piezoelectric assembly is disposed at least partially in the second cavity and comprises an elongated piezoelectric layer, a sealing pad, and an electrical contact disposed distally from the sealing pad. The electrical contact is configured to receive a voltage such that the piezoelectric layer deforms to cause the sealing pad to selectively seal or unseal the second port. The piezoelectric assemblies of the first and second housing may be configured to oppositely cover or uncover their respective port upon application of a voltage thereto. For example, the port of the first housing may be normally opened where application of a voltage operates to seal the port, whereas the port of the second housing may be normally closed whereby application of a voltage operates to open the port.

The valve assembly of the present invention employing piezoelectric actuating assemblies provides a compact and accurate flow control valve. These and other objects, advantages, purposes and features of this invention will become apparent upon review of the following specification in conjunction with the drawings.

DESCRIPTION OF THE PREFERRED EMBODIMENTS

Figure 1A:
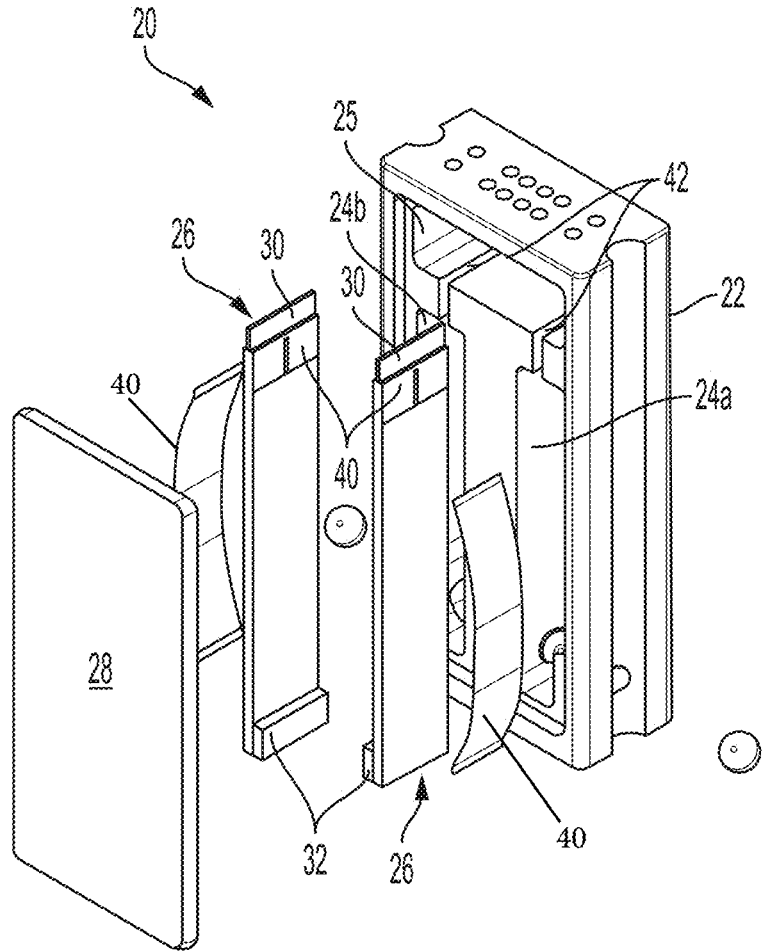
FIG. 1A is an exploded perspective view of one embodiment of a valve assembly in accordance with the present invention.

The present invention will now be described with reference to the accompanying figures, wherein the numbered elements in the following written description correspond to like-numbered elements in the figures. With initial reference to FIG. 1A, a valve assembly 20 is illustrated that includes a housing having a body 22 defining a pair of interior chambers or cavities 24*a*, 24*b*, within each of which is disposed an elongated piezoelectric assembly 26, with valve assembly 20 further including a cover 28 that is mounted over cavities 24*a*, 24*b* to enclose piezo assemblies 26 within the respective cavities 24*a*, 24*b*. As discussed in more detail below, in use power is applied to contact pads 30 on one end of piezo assemblies 26 to selectively deform or curve the elongated piezo assemblies 26 whereby rubberized sealing pads 32 disposed on the opposite end from contact pads 30 are either selectively moved away from or cover ports 34*a*, 34*b* within cavities 24*a*, 24*b* (FIG. 1C) of body 22 to control flow, such as air or a gas, through valve assembly 20. In the illustrated embodiment, valve assembly 20 comprises a three-way valve with piezo assemblies 26 enabling valve assembly 20 to provide a compact and accurate flow control valve.

Figure 1B:
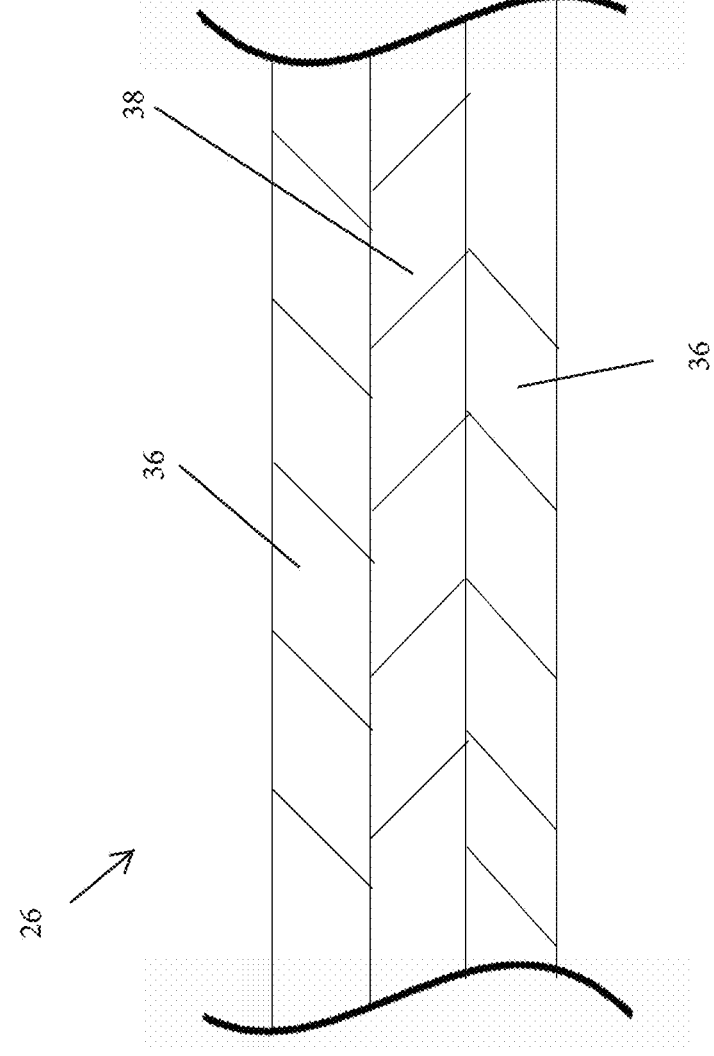
FIG. 1B is a partial cross sectional view of a piezoelectric assembly of FIG. 1A.

With further reference to the illustrated embodiment of FIG. 1B, piezo assemblies 26 comprise a stacked or layered assembly that includes a pair of piezo element layers 36 sandwiched or disposed about a ground plate 38, where the piezo element layers 36 and ground plate 38 comprise a conventional trimorph piezo construction. Each piezo assembly 26 further includes a pair of contact pads 30 on either side of the piezo assembly 26. As discussed in more detail below, electrical contact is selectively made with one of the given contact pads 30 on either side of the piezo assembly 26 to cause the respective piezo element layer 36 associated with the electrically contacted contact pad 30 to contract, thereby imparting a bending displacement to the piezo assembly 26. That is, with respect to the elongated length of the piezo assembly 26, upon application of a voltage to the contact pad 30 the piezo assembly 26 will bend in a generally U-shape with respect to its elongated length due to the contraction of a given piezo element layer 36. In the illustrated embodiment piezo assembly is approximately 0.25 inches wide, 1.5 inches long, and approximately 2 mm thick, with a voltage being applied to contact pads, such as a voltage greater than 100 volts being applied to contact pads 30, to cause the bending or curling of the piezo assembly 26. The materials of piezo element layers 36 may be made from or comprise ceramic materials or layers, and the ground plate 38 may comprises a passive layer. It should be appreciated that piezo assemblies in accordance with the present invention may be constructed of alternative materials and sizes, as well as activated with alternative voltages. Still further, for example, although shown and described as a trimorph piezo construction, it alternatively may be configured to have a monomorph, bimorph or multimorph construction. The configuration of the piezo assembly may be at least in part based on the desired valve strategies and requirements, including but not necessarily limited to the amount of movement required, as well as whether the piezo assembly is powered by a voltage to return to a home position or whether the piezo assembly returns to a home position by dropping or removing a voltage applied thereto to spring back to its normal or home position.

Body 22 additionally includes an upper cavity 25 within which contact pads 30 of the piezo assemblies 26 are disposed when assembled. On either side of the piezo assemblies 26 in the embodiment of FIG. 1A, sealing surfaces 40 are provided that are configured to mate with slots 42 in body 22. Sealing surfaces may comprise, for example, an adhesive that is cured after insertion of piezo assemblies 26 into slots 42 to thereby seal cavities 24*a*, 24*b* when cover 28 is secured to body 22, where various types of known adhesives may be used.

With further reference to FIG. 1A, a pair of biasing members or springs 44 are shown, with one of each spring 36 being disposed in separate ones of the interior cavities 24*a*, 24*b*. In the illustrated embodiment springs 36 are configured as leaf springs and provide a biasing force to urge sealing pads 32 into a closed position against sealing ports 34*a*, 34*b*. Upon application of a voltage to a given contact pad 30, the sealing pad 32 is lifted from the respective port 34*a*, 34*b*. Although springs 44 are shown in the illustrated embodiment as biasing sealing pads 32 into a normally closed position, it should be appreciated that alternative arrangements of biasing members may be employed, including for example to bias a sealing pad 32 of a given piezo assembly 26 into a normally open position. Still further, as discussed in more detail below, springs 44 may be optionally employed whereby only one or neither of such springs 44 is used. It should also be appreciated that alternative biasing members or springs may be employed, such as compression or coil springs or resilient elements.

Figure 1C:
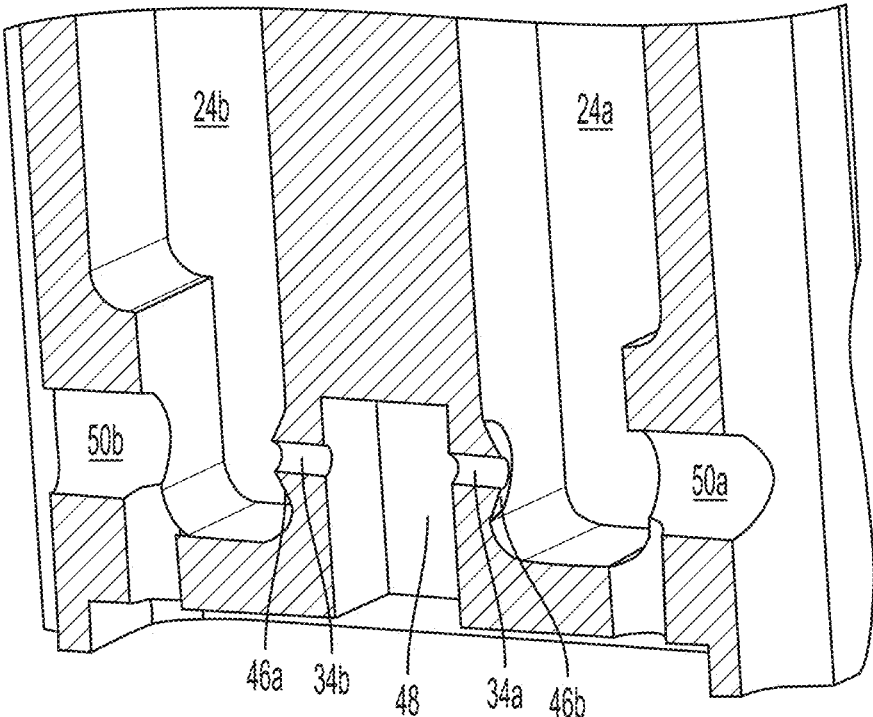
FIG. 1C is a close up partial perspective view of a body of the valve assembly of FIG. 1.

As noted, FIG. 1C illustrates ports 34*a*, 34*b* associated with each of cavities 24*a*, 24*b*, with ports 34*a*, 34*b* each including a seat 46*a*, 46*b* upon which sealing pads 32 contact. As shown, body 22 additionally includes a central port 48 as well as two side ports 50*a*, 50*b* associated with each of cavities 24*a*, 24*b*, respectively.

Figure 2:
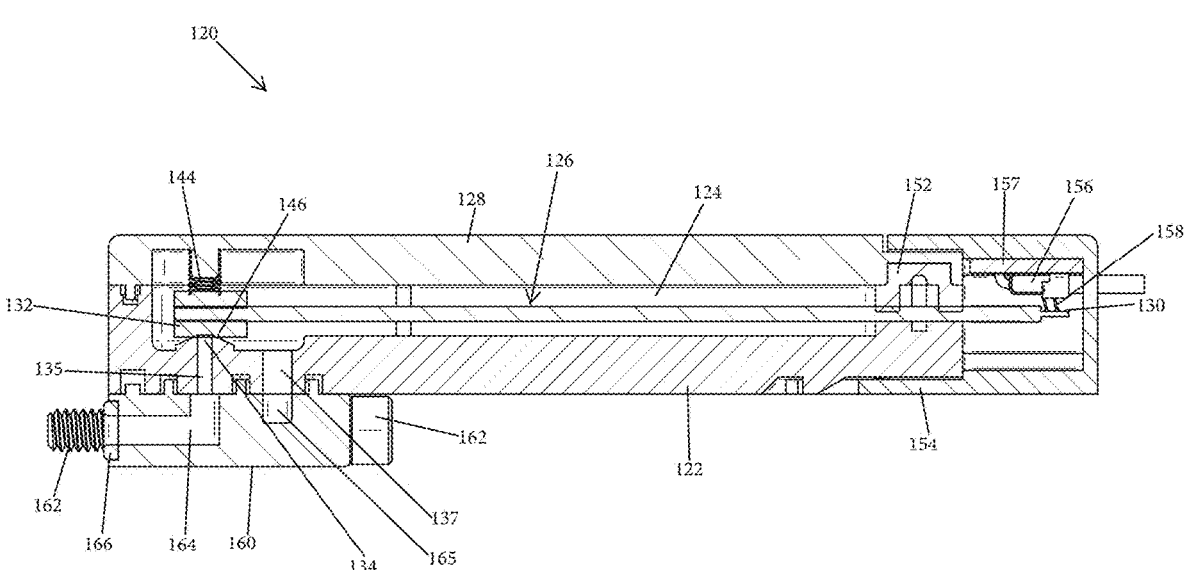
FIG. 2 is a cross sectional view of another embodiment of a valve assembly in accordance with the present invention.

An alternative valve assembly 120 is illustrated in FIG. 2 in which valve assembly 120 is a two-way valve and shares numerous features with valve assembly 20. Similar components of valve assembly 120 are identified with similar reference numerals as used with valve assembly 20, but with 100 added to the reference numerals relative to valve assembly 20. Due to the similarities not all of the features and functions of valve assembly 120 are discussed herein.

Valve assembly 120 includes a housing comprising a body 122 and a cover 128 defining a cavity 124 within which piezoelectric assembly 126 is disposed. Piezo assembly 126 includes a sealing pad 132 configured as an encapsulated end that surrounds the entirety of the end of piezo assembly 126 as opposed to sealing pads 32 of piezo assembly 26 that are disposed on one side of the assembly 26. Sealing pad 132 may be formed of a resilient material, such as rubber or a rubber like material, for providing a compliant seal to port 134 at seat 146. Valve assembly 120 includes a biasing member configured as a compression spring 144 that presses against one side of sealing pad 132 to provide a biasing force and urge the opposite side of sealing pad 132 into a normally closed position in which sealing pad 132 engages with seat 146 to seal port 134.

Toward the opposite end of piezo assembly 126 from sealing pad 132, cover 128 and body 122 clamp together at a sealing element 152 such that cavity 124 is sealed at the joint formed thereby. Sealing element 152 may comprise a resilient member, such as a gasket, an adhesive seal, or another alternative known sealing configuration or material.

An end cap 154 is disposed over the exposed end of piezo assembly 126. As shown, an electrical connector 156 passes through end cap 154 to provide electrical voltage to piezo assembly 126 via a contact 158, where contact 158 is in contact with contact pad 130 of piezo assembly 126 and comprises a spring loaded contact. That is, electrical contact 158 is biased into engagement or contact with contact pad 130. Connector 156 comprises a circuit board 157 or other form of connection for applying voltage through the contact 158.

As previously discussed, upon application of a voltage to contact pad 130 the piezo element layer associated with the contact pad 130 is caused to contract, which in the illustrated orientation of FIG. 2 would be the upper piezo element layer. The contraction thereby causes piezo assembly 126 to curve into a U-shape such that sealing pad 132 overcomes the biasing force of spring 144 and is lifted off the seat 146 to uncover port 134. It should be appreciated that in an alternative embodiment the application of a voltage may be provided to contract a piezo element layer into causing a contact pad to cover and thus seal a port. Still further in an arrangement having two piezo elements voltage may be selectively separately applied to the given elements to cause contraction, such as at opposite times.

Valve assembly 120 additionally includes a manifold 160 that is mounted to and sealed against body 122. Manifold 160 enables flow into or out of valve assembly 120 under control of piezo assembly 126 to be exchanged with another body to which valve assembly 120 with manifold 160 is attached. For example, a fastener 162 passes through manifold 160 and is used to threadingly engage to such a body, such as where valve assembly 120 is in a vertical upright orientation. Flow is then able to flow through passage 164 of manifold 160 that is aligned with port 134 and its associated passage 135 in body 122. Likewise, body 122 includes an additional passage 137 within cavity 124 that is aligned with passage 165 in manifold 160. As shown, manifold 160 includes a seal 166, such as a gasket or o-ring for sealing between the manifold 160 and the body to which it is attached.

Figure 3:
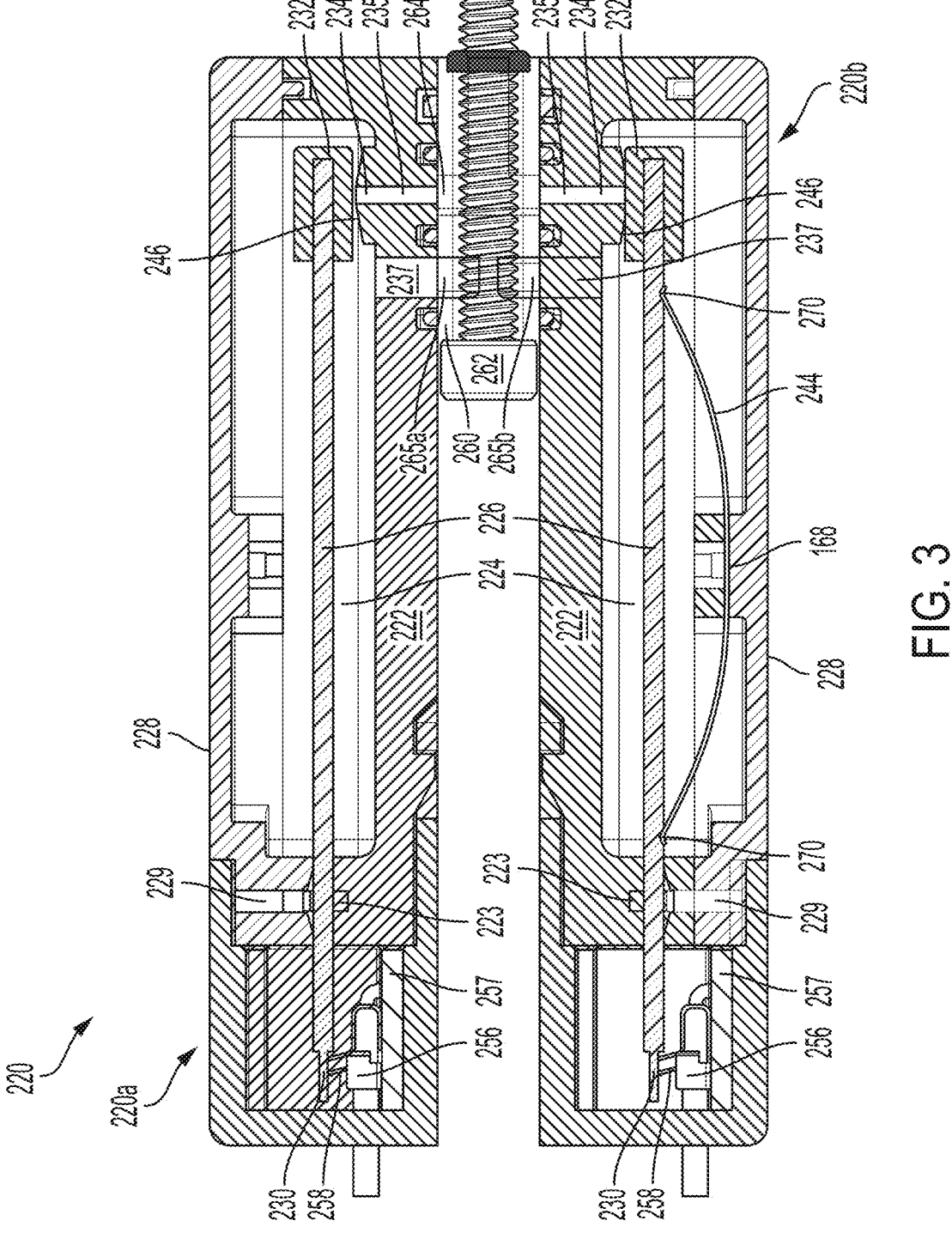
FIG. 3 is a cross sectional view of yet another embodiment of a valve assembly in accordance with the present invention.

Another valve assembly 220 is illustrated in FIG. 3 in which valve assembly 220 is a three-way valve and shares numerous features with valve assemblies 20 and 120. Similar components of valve assembly 220 are identified with similar reference numerals as used with valve assemblies 20 and 120, but with 200 and 100 added to the reference numerals relative to valve assemblies 20 and 120, respectively. Due to the similarities not all of the features and functions of valve assembly 220 are discussed herein.

Valve assembly 220 comprises a pair of valve assemblies 220a, 220b, with each of valve assemblies 220a, 220b being substantially similar to valve assembly 120 discussed above and being connected together via manifold 260. Each valve assembly 220a, 220b includes a housing comprising a body 222 and a cover 228 defining a cavity 224 within which piezoelectric assembly 226 is disposed. Piezo assembly 226 includes a sealing pad 232 configured as an encapsulated end that surrounds the entirety of the end of piezo assembly 226.

Valve assembly 220a comprises a normally open valve assembly in which its sealing pad 232 is not engaged with seat 246 when voltage is not being applied to the piezo assembly 226 of assembly 220a. In contrast, valve assembly 220b comprises a normally closed valve assembly and includes a biasing member configured as a leaf spring 244 that presses the sealing pad 232 of valve assembly 220b into a normally closed position in which the sealing pad 232 engages with seat 246 to seal port 234. As shown, the leaf spring 244 is a u-shaped member in which a central portion 268 is engaged with the cover 228 to press the ends 270 of the leaf spring 244 into engagement with the piezo assembly 226.

Each cover 228 includes a bore 229 with body 222 including a corresponding aligned channel 223 at the passage of piezo assembly out of cavity 224. A sealing material, such as an adhesive material, may be inserted or injected into bore 229 to flow around and into channel 223, with the material then curing to seal cavity 224. End caps 254 are disposed over the exposed ends of the piezo assemblies 226 of each valve assembly 220a, 220b.

As shown in the valve assembly 220a, contact 258 of connector 256 is engaged with the contact pad 230 of the piezo assembly 226 such that upon application of voltage contraction of the lower piezo element layer causes the piezo assembly 226 to bend or deform into a generally inverted U-shape whereby its sealing pad 232 engages with seat 246 to seal the port 234 of valve assembly 220a.

Conversely, in the valve assembly 220b, contact 258 of connector 256 is engaged with the contact pad 230 of the piezo assembly 226 such that upon application of voltage contraction of the lower piezo element layer causes the piezo assembly 226 to bend or deform into a generally inverted U-shape whereby piezo assembly 226 overcomes the biasing force of spring 244 whereby the sealing pad 232 of valve assembly 220b is moved out of engagement with the seat 246 to open the port 234 of valve assembly 220b.

It should thus be appreciated that valve assemblies 220a, 220b are substantially similar, but with the electrical connectors 256 assembled whereby the respective contacts 258 of each of valve assemblies 220a, 220b engage with contact pads 230 on opposite sides of the respective piezo assemblies 226.

Manifold 260 is mounted to and sealed against each of the housings 222 of valve assemblies 220a, 220b. Manifold 260 enables flow into or out of each valve assembly 220a, 220b under control of their respective piezo assemblies 226 along with another body to which the valve assembly 220 with manifold 260 is attached. For example, fastener 262 passes through manifold 260 and is used to threadingly engage to such a body, such as where valve assembly 220 is in a vertical upright orientation, with seal 266 sealing between manifold 260 and the body to which it is mounted. Manifold 260 includes a T-shaped passage 264 that is in fluid communication with the body at seal 266 and in fluid communication with the ports 234 and associated passages 235 of each valve assembly 220a, 220b. In addition, each body 222 includes an additional passage 237 that are each likewise aligned with one or more passages 265a, 265b of manifold 260.

In the valve assembly 220 of FIG. 3, the piezoelectric assemblies of the assemblies 220a, 220b are configured to oppositely cover or uncover their respective ports upon application of a voltage thereto. For example, the port of assembly 220a is normally opened where application of a voltage operates to seal the port, whereas the port of assembly 220b is normally closed whereby application of a voltage operates to open the port.

Figure 4:
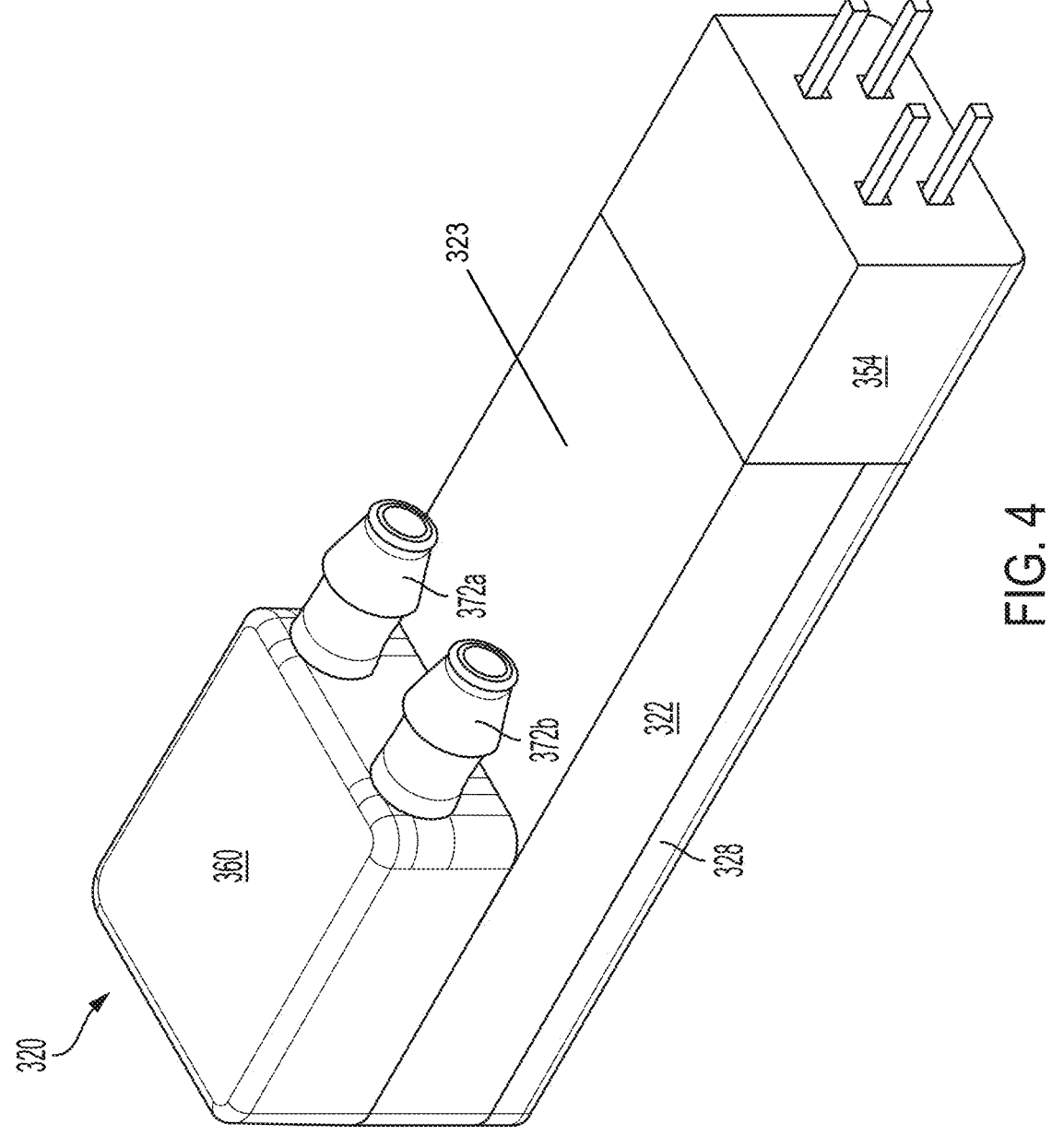
FIG. 4 is a front perspective view of a further embodiment of a valve assembly in accordance with the present invention having a moveable manifold.

FIG. 4 illustrates still another valve assembly 320 that shares numerous features with valve assemblies 20, 120 and 220. Similar components of valve assembly 320 are identified with similar reference numerals as used with valve assemblies 20, 120 and 220, but with 300, 200 and 100 added to the reference numerals relative to valve assemblies 20, 120 and 220, respectively. Due to the similarities not all of the features and functions of valve assembly 320 are discussed herein.

Valve assembly 320 includes a housing comprising a body 322 having an outer surface 323 and a cover 328 defining a cavity 324 within which a piezoelectric assembly is disposed. Valve assembly 320 includes a turret or rotatable manifold 360 having a pair of prongs or barbs 372a, 372b to which tubes may be attached for flow controlled via valve assembly 320. Of particular note, manifold 360 is moveable in that it may be affixed to body 322 as shown or, alternatively, may be reversed 180 degrees whereby barbs 372a, 372b are oriented to point in an opposite direction from that shown in FIG. 4.

Figure 5:
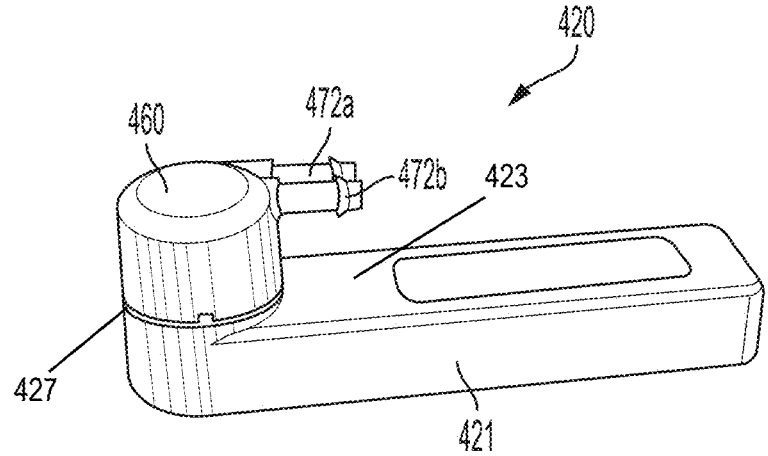
FIG. 5 is a perspective view of another embodiment of a valve assembly in accordance with the present invention having moveable manifold that is rotatable.

FIG. 5 discloses another valve assembly 420 that shares numerous features with valve assemblies 20, 120, 220 and 320. Similar components of valve assembly 420 are identified with similar reference numerals as used with valve assemblies 20, 120, 220, and 320 but with 400, 300, 200 and 100 added to the reference numerals relative to valve assemblies 20, 120 and 220, respectively. Due to the similarities not all of the features and functions of valve assembly 420 are discussed herein.

Valve assembly 420 includes a housing 421 within which a piezoelectric assembly is disposed. Valve assembly 420 includes a manifold 460 having a pair of prongs or barbs 472a, 472b to which tubes may be attached for flow controlled via valve assembly 420. Manifold 460 comprises a rotatable turret or a moveable manifold, in similar manner to manifold 360, but is rotatable over 360 degrees relative to housing 421 to provide increased adjustability of the location or orientation of barbs 472a, 472b. Manifold 460 is sealed to housing 421 at outer surface 423 via gaskets, o-rings, such as o-ring 427, or other sealing method to set a fixed position.

Figure 6:
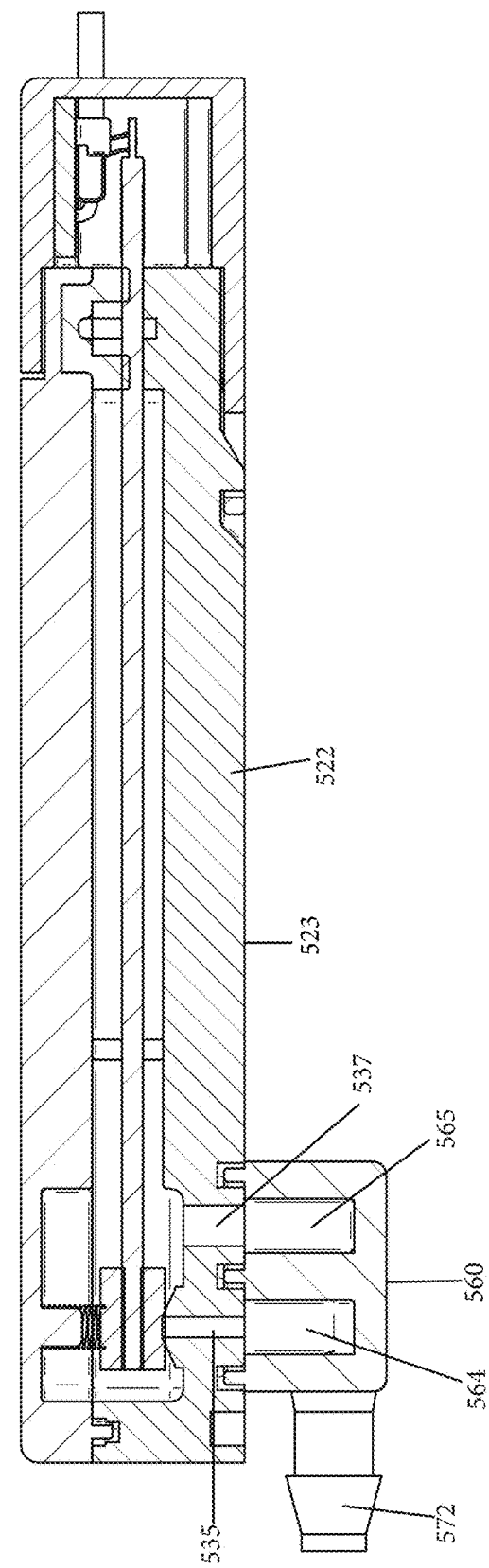
FIG. 6 is a cross sectional view of a valve assembly having a moveable manifold.

With reference to FIG. 6, a valve assembly 520 is shown having a moveable manifold 560 on outer surface 523, where valve assembly 520 is likewise substantially similar to valve assemblies 20, 120, 220, 320 and 420, discussed above, and is marked with similar reference numerals. Due to the similarities not all of the features and functions of valve assembly 520 are discussed herein. Manifold 560 includes a pair of barbs 572, only one of which is shown in FIG. 6, and further includes passages 564, 565, where each of passages 564, 565 are in separate fluid communication with a given one of the barbs 572. As shown, passage 564 is aligned with passage 535 of body 522 and passage 565 is aligned with passage 537 of body 522. Manifold 560 may be reversed, however, whereby passages 564, 565 are instead aligned with passages 537, 535 of body 522, respectively.

Figure 7:
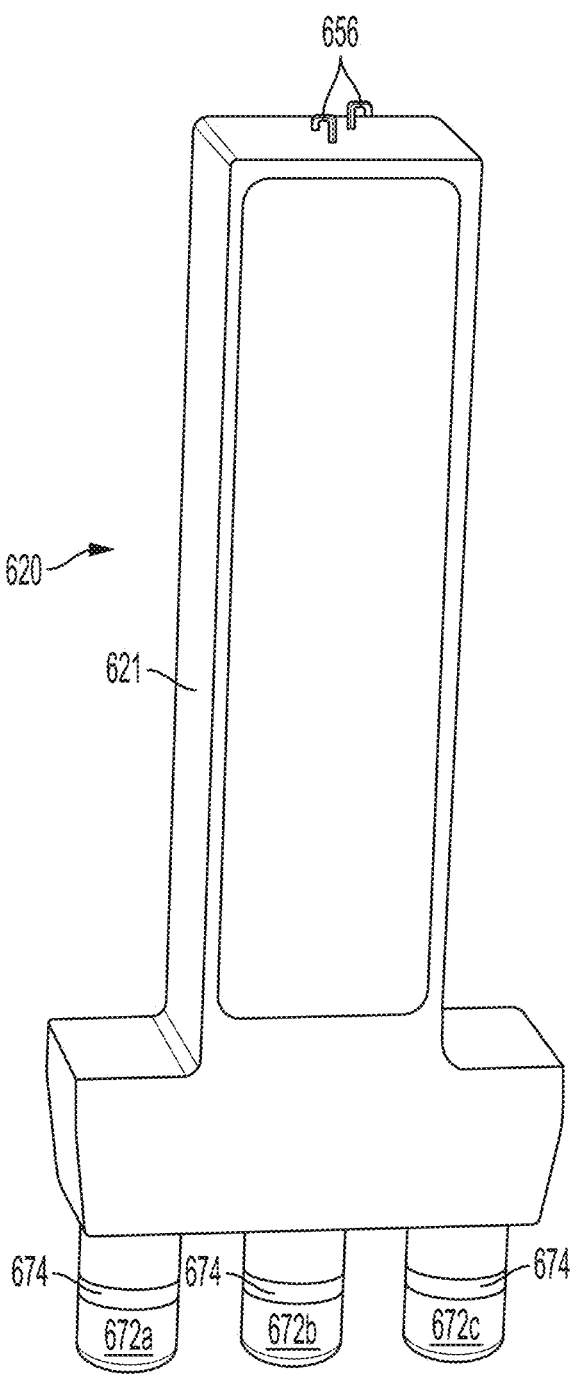
FIG. 7 is a perspective view of another embodiment of a valve assembly in accordance with the present invention.

FIG. 7 discloses yet another piezoelectric actuated valve assembly 620 in accordance with the present invention that shares numerous features with valve assemblies 20, 120, 220, 320, 420 and 520, discussed above, and is marked with similar reference numerals. Valve assembly 620 is configured as a three-way valve and thus includes a pair of internal piezo assemblies within housing 621, with associated connectors 656 for each of the piezo assemblies being shown at the upper portion of housing 621. Housing 621 includes three extending flow connectors 672a, 672b, 672c that define ports and passages into valve assembly 620, where connectors 672a, 672b, 672c are insertable in a plug in manner into corresponding receptacles on another body whereby valve assembly 620 is able to control the flow, such as of air or a gas, there through. As shown, each of connectors 672a, 672b, 672c include an o-ring 674 for sealing upon insertion therein. Although shown as having extending connectors it should be appreciated that such an alternative valve assembly may be constructed with inwardly oriented receptacles for receiving corresponding connectors.

Figure 8:
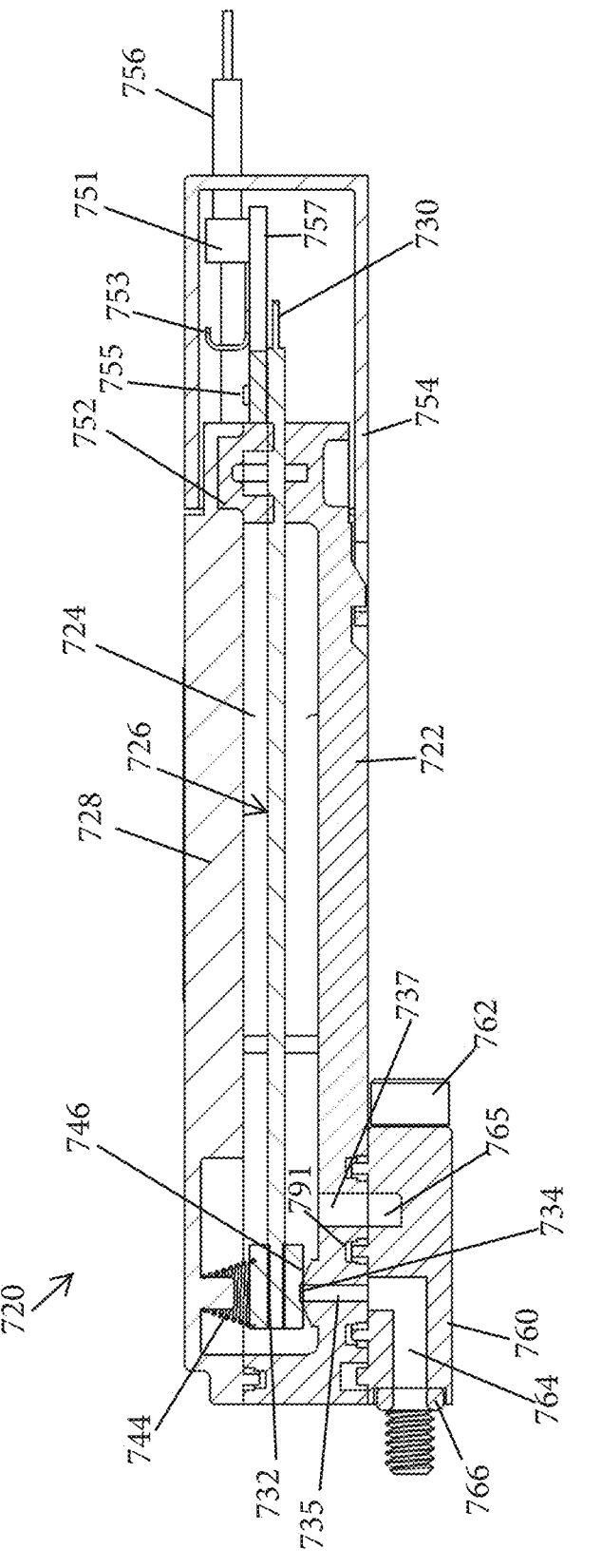
FIG. 8 is a cross sectional view of another embodiment of a valve assembly in accordance with the present invention.
Figures 9A, 9B, 9C, 9D, 10A, 10B, 10C:
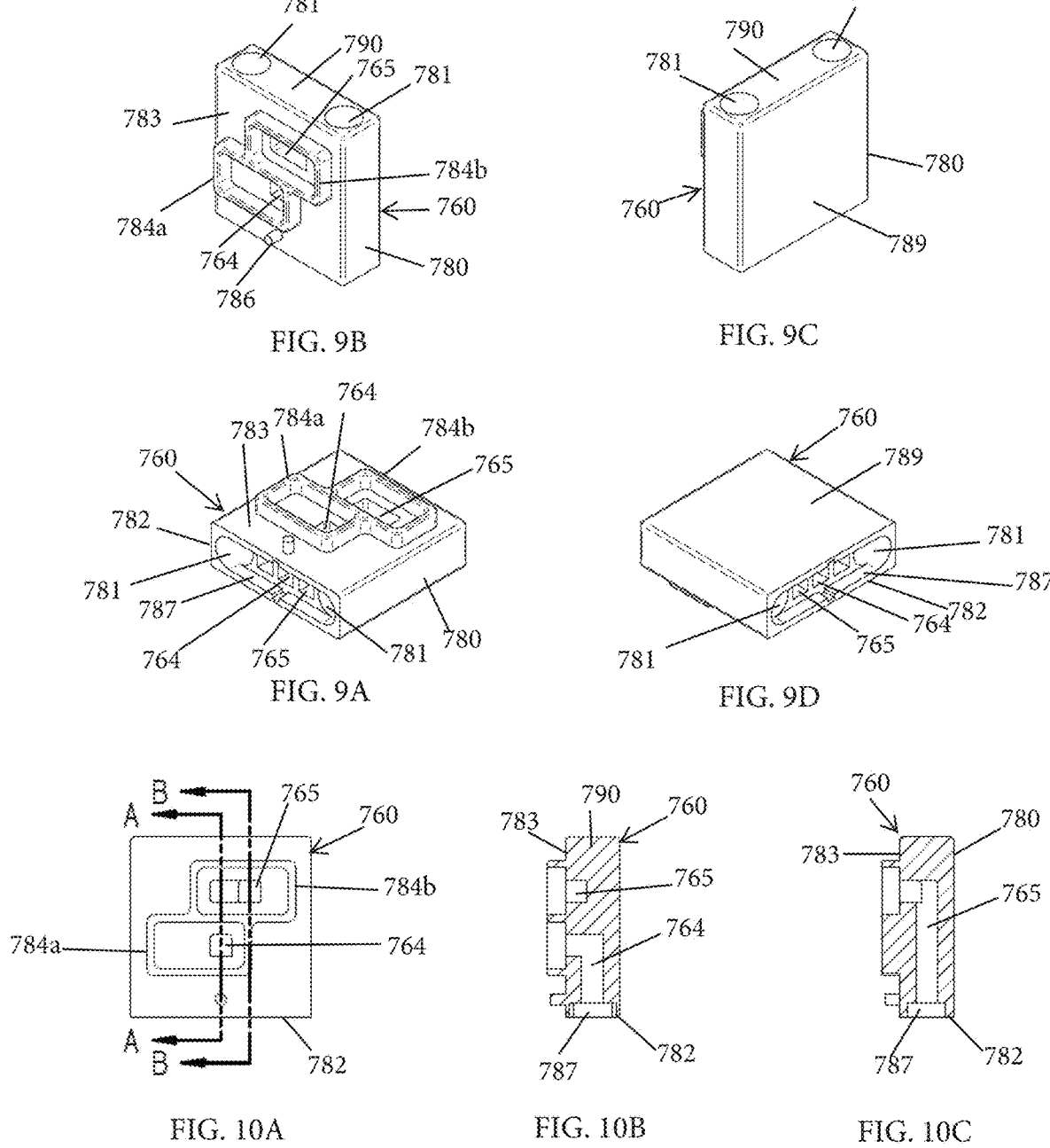
FIGS. 9A-9D are perspective views of the manifold adapter of FIG. 8 shown removed from the valve assembly.
FIG. 10A is a top plan view of the manifold adapter of FIG. 8.
FIGS. 10B and 10C are sectional views of the manifold adapter of FIG. 8 taken along the lines A-A and B-B of FIG. 10A, respectively.

FIG. 8 discloses another piezoelectric actuated valve assembly 720 in accordance with the present invention that shares numerous features with valve assemblies 20, 120, 220, 320, 420 and 520, discussed above and is marked with similar reference numerals. In particular, valve assembly 720 shares similarities with valve assembly 120 of FIG. 2, with similar components of valve assembly 720 being identified with similar reference numerals as used with valve assembly 120, but with 600 added to the reference numerals relative to valve assembly 120. Due to the similarities not all of the features and functions of valve assembly 720 are discussed herein.

Valve assembly 720 is a two-way valve and includes a housing comprising a body 722 and a cover 728 defining a cavity 724 within which piezoelectric assembly 726 is disposed. Piezo assembly 726 includes a sealing pad 732 configured as an encapsulated end that surrounds the entirety of the end of piezo assembly 726 and may be formed of a resilient material, such as rubber or a rubber like material, for providing a compliant seal to port 734 at seat 746. Valve assembly 720 includes a biasing member configured as a compression spring 744 that presses against one side of sealing pad 732 to provide a biasing force and urge the opposite side of sealing pad 732 into a normally closed position in which sealing pad 732 engages with seat 746 to seal port 734. It should be appreciated that such a piezo-electric assembly may alternatively be configured to be in a normally open position, including such as via a biasing member against which a piezo assembly may act.

Toward the opposite end of piezo assembly 726 from sealing pad 732, cover 728 and body 722 clamp together at a sealing element 752 such that cavity 724 is sealed at the joint formed thereby. Sealing element 752 may comprise a resilient member, such as a gasket, an adhesive seal, or another alternative known sealing configuration or material.

End cap 754 is disposed over the exposed end of piezo assembly 726. As shown, an electrical connector 756 configured as a wire with an external insulation layer passes through end cap 754 to provide electrical voltage to piezo assembly 726. In the illustrated embodiment, circuit or driver board 757 is soldered to the piezo assembly 726, with wire 756 inserted into a push in wire terminal 751 that is mounted to the circuit board 757. Terminal 751 includes an integrated stop 753 against which the wire 756 contacts for limiting its insertion. Circuit board 757 includes a resistor 755 for use in damping the piezo assembly 726. A voltage is thus provided by wire 756 to circuit board 757, which in turn is in electrical connection with piezo assembly 726 by being electrically connected thereto, such as by way of being soldered, welded or by way of another form of electrical contact, so as to provide power to the piezo assembly 726, such as via contact pad 730. In the illustrated embodiment, piezo assembly 726 is configured to have a trimorph piezo construction with just the top layer being selectively actuated to contract and curve into a U-shape to overcome the biasing force of spring 744 and thereby lift the sealing pad 732 from the seat 746 and open port 734. Alternative constructions of the piezo assembly may be employed.

Valve assembly 720 additionally includes a manifold or manifold adapter 760 that is mounted to and sealed against body 722. Manifold 760 enables flow into or out of valve assembly 720 under control of piezo assembly 726 to be exchanged with another body to which valve assembly 720 with manifold 760 is attached. For example, fasteners 762 pass through manifold 760 and are used to threadingly engage to such a body, such as where valve assembly 720 is in a vertical upright orientation. Flow is then able to flow through passage 764 of manifold 760 that is aligned with port 734 and its associated passage 735 in body 722. Likewise, body 722 includes an additional passage 737 within cavity 724 that is aligned with passage 765 in manifold 760. As shown, manifold 760 includes a seal 766, such as a gasket or o-ring for sealing between the manifold 760 and the body to which it is attached. Flow into and out of manifold 760 may thus be controlled by valve assembly 720 via control of the piezo assembly 726.

Manifold 760 is further illustrated in FIGS. 9A-9C and FIGS. 10A-10C. As there shown, manifold 760 comprises a manifold body 780 with through holes 781 for receiving fasteners 762 for mounting. Manifold 760 further includes a front end 782 and a top surface 783 with top surface 783 including sealing rings or ridges, such as a rim or rib or edge, that in the illustrated embodiment are configured as rectangular overlapping ridges 784a, 784b, where ridges 784a, 784b mate with grooves 791 in body 722 for sealing. A sealing material may be used to aid the sealing within grooves 791, such as an adhesive. Manifold body 780 may also include a locating pin 786 for aid in positioning manifold body 780 to valve body 722. Manifold passage 764 opens at both the front end 782 and on the top surface 783 within sealing ridge 784a. Correspondingly, manifold passage 765 opens at both front end 782 and top surface 783 but within sealing ridge 784b. In the illustrated embodiment manifold passage 764 comprises an inlet passage and manifold passage 765 comprises an outlet passage whereby flow in and out of manifold 760 is controlled by valve assembly 720. Manifold body 780 further includes a recess 787 at which seal 766 is positioned, where seal 766 may comprise a single seal with separate openings for each of passages 764, 765 at front end 782, or may comprise separate seals disposed about the openings of passages 764, 765 at front end 782. Manifold 760 further includes a back surface 789 and a back end 790.

Although shown as including sealing ridges 784a, 784b, an alternative manifold need not include such ridges and instead seal by o-rings, adhesives or the like. In such an embodiment, the top surface 783 of the manifold 760 would press against the body 722.

Figure 11:
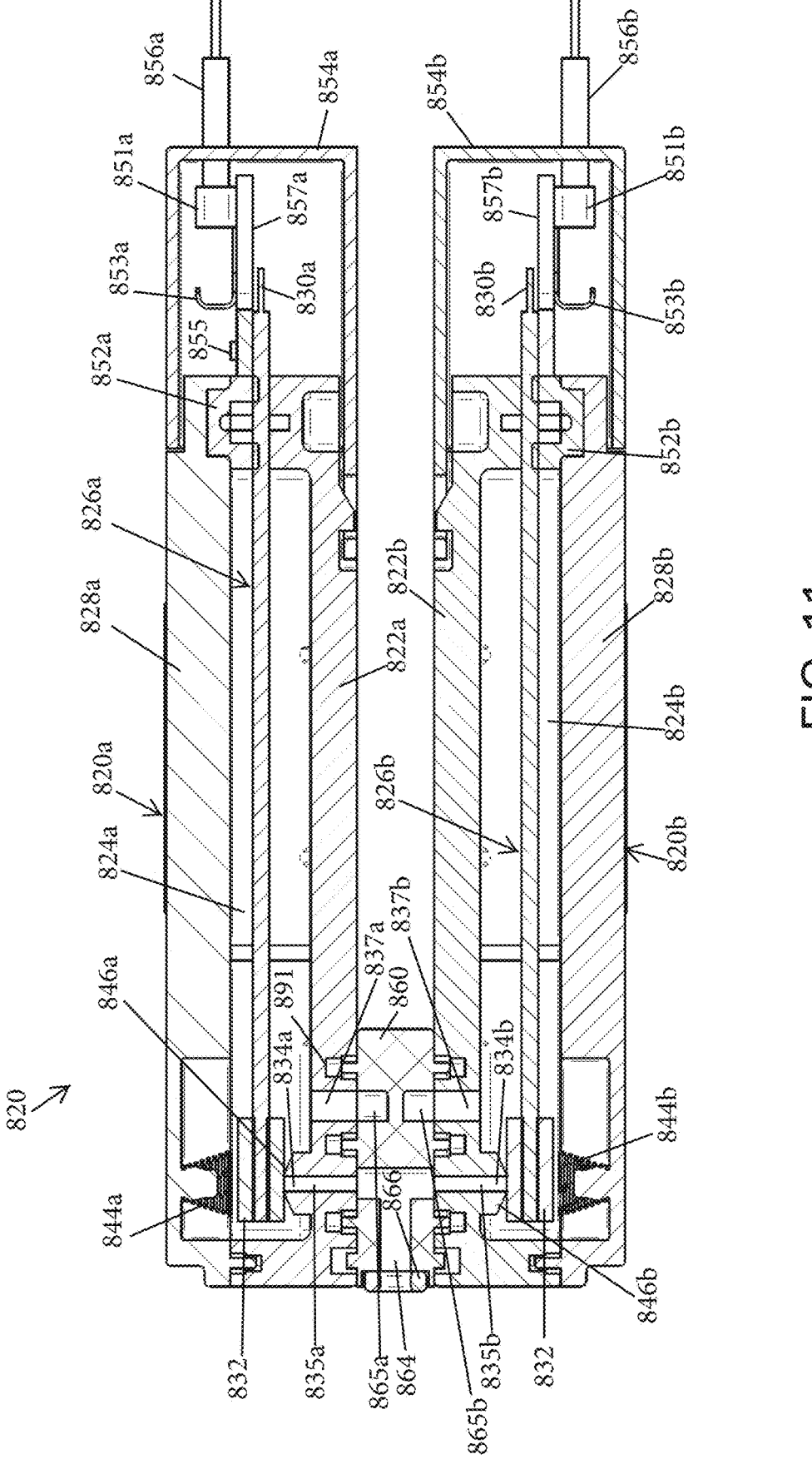
FIG. 11 is a cross sectional view of yet another embodiment of a valve assembly in accordance with the present invention.
Figures 12A, 12B, 12C, 12D, 13A, 13B, 13C, 13D:
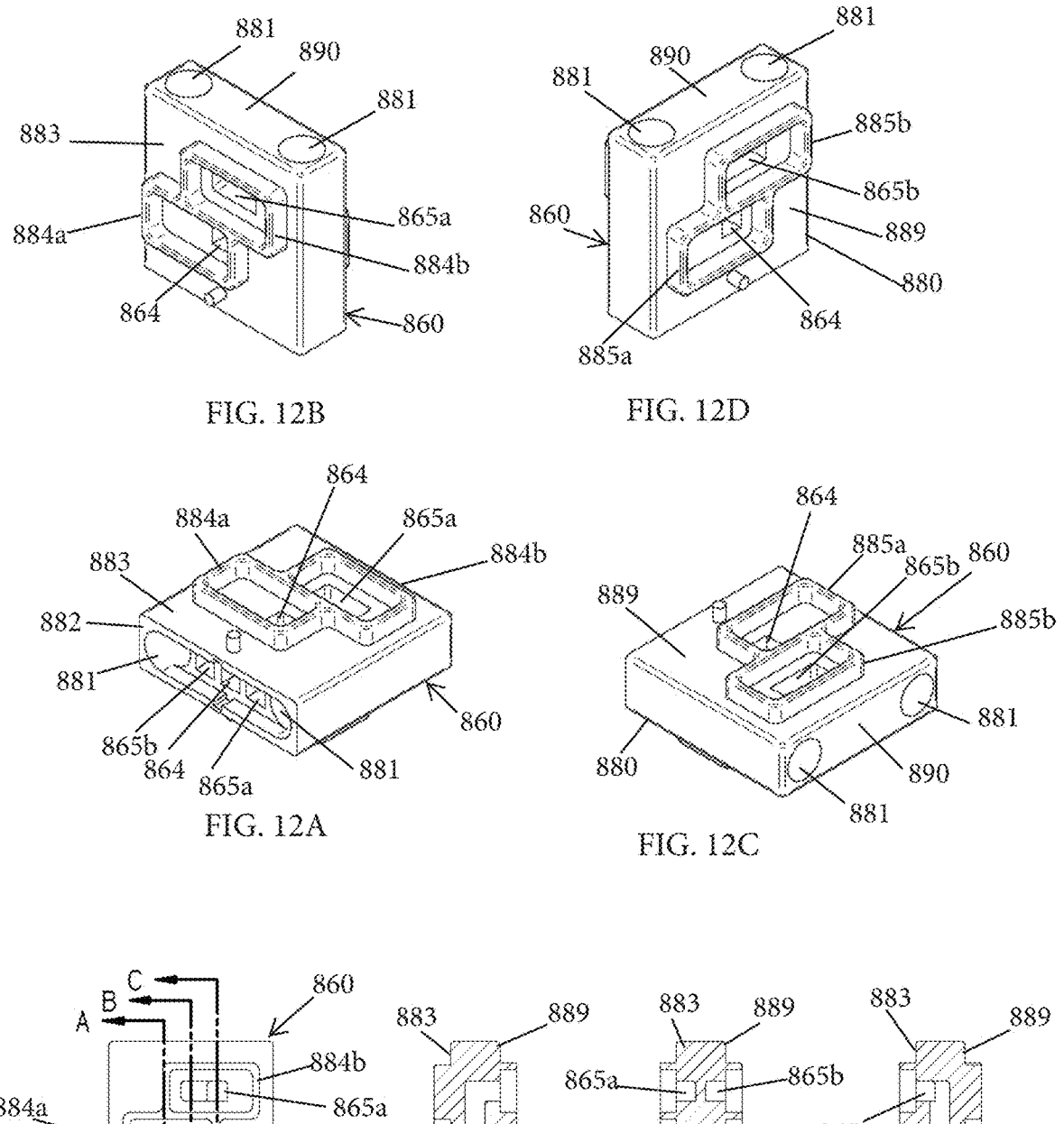
FIGS. 12A-12D are perspective views of the manifold adapter of FIG. 11 shown removed from the valve assembly.
FIG. 13A is a top plan view of the manifold adapter of FIG. 11.
FIGS. 13B-13D are sectional views of the manifold adapter of FIG. 11 taken along the lines A-A, B-B and C-C of FIG. 13A, respectively.

FIG. 11 discloses another piezoelectric actuated valve assembly 820 in accordance with the present invention that shares numerous features with the above discussed valve assemblies and is likewise marked with similar reference numerals. In particular, valve assembly 820 shares similarities with valve assemblies 220 and 720 of FIGS. 3 and 8, with similar components of valve assembly 820 being identified with similar reference numerals as used with valve assemblies 220 and 720, but with 600 and 100 added to the reference numerals relative to valve assemblies 220 and 720, respectively. Due to the similarities not all of the features and functions of valve assembly 820 are discussed herein.

Valve assembly 820 comprises a pair of valve assemblies 820a, 820b, with each of valve assemblies 820a, 820b being substantially similar to valve assembly 720 discussed above and being connected together via manifold 860, where each valve assembly 820a, 829b may be referred to as a valve subassembly in the context of valve assembly 820. Each valve assembly 820a, 820b includes a housing comprising a body 822a, 822b and a cover 828a, 828b defining a cavity 824a, 824b within which piezoelectric assemblies 826a, 826b are disposed. Piezo assemblies 826a, 826b each include a sealing pad 832 configured as an encapsulated end.

Valve assembly 820a comprises a normally closed valve assembly in which its sealing pad 832 is normally engaged with seat 846a when voltage is not being applied to the piezo assembly 826a, with spring 844a biasing the pad 832 against the seat 846a. Valve assembly 820b likewise comprises a normally closed valve assembly and includes spring 844b that presses the sealing pad 832 of valve assembly 820b into a normally closed position in which the sealing pad 832 engages with seat 846a to seal port 834a.

Each cover valve assembly 820a, 820b includes a sealing element 852a, 852b at the passage of the piezo assemblies 826am 826b out of cavities 824a, 824b. End caps 854a, 854b are disposed over the exposed ends of the piezo assemblies 826a, 826b. Wires 856a, 856b pass through end caps 854a, 854b to provide electrical voltage to the respective piezo assemblies 826a, 826b. Circuit boards 857a, 857b are likewise soldered to the piezo assemblies 826a, 826b, with wires 856a, 856b inserted into wire terminals 851a, 851b that are mounted to the circuit boards 857a, 857b, with wires 856a, 856b extending to integrated stops 853a, 853b. Circuit boards 857a, 857b likewise each includes a resistor 855 for use in damping the piezo assemblies 826a, 826b. Voltages are thus provided by wires 856a, 856b to circuit boards 857a, 857b, which in turn are in electrical connection with piezo assemblies 826a, 826b by way of being soldered thereto so as to provide power to the piezo assemblies 826a, 826b, such as via respective contact pads 830a, 830b. In the illustrated embodiment, piezo assemblies 826a, 826b are configured to have a trimorph piezo construction. In valve assembly 820a the voltage is applied to the top layer so as to be selectively actuated to contract and curve into a U-shape to overcome the biasing force of spring 844a and thereby lift the sealing pad 832 from the seat 846a and open port 834a. Correspondingly, in valve assembly 820b the voltage is applied to the bottom layer so as to be selectively actuated to contract and curve into an inverted U-shape to overcome the biasing force of spring 844b and thereby displace the sealing pad 832 from the seat 846b and open port 834b.

It should thus be appreciated that valve assemblies 820a, 820b are substantially similar, but with are mounted to manifold 860 in mirror relation to one another. It should be appreciated that alternative arrangements and configurations of the valve assemblies 820a, 820b as part of a three-way valve arrangement. Including having one valve assembly be normally closed and the other normally open.

Manifold 860 is mounted to and sealed against each of the housings 822a, 822b of valve assemblies 820a, 820b. Manifold 860 enables flow into or out of each valve assembly 820*a*, 820*b* under control of their respective piezo assemblies 826*a*, 826*b* along with another body to which the valve assembly 820 with manifold 860 is attached, such as in a vertical arrangement. For example, fasteners (not shown) pass through manifold 860 and are used to threadingly engage to such a body, such as where valve assembly 820 is in a vertical upright orientation, with seal 866 sealing between manifold 860 and the body to which it is mounted. Manifold 860 includes a T-shaped passage 864 that is in fluid communication with the body at seal 866 and in fluid communication with the ports 834*a*, 834*b* and associated passages 835*a*, 835*b* of each valve assembly 820*a*, 820*b*. In addition, each body 822*a*, 822*b* includes an additional passage 837*a*, 837*b* that are each likewise aligned with one or more passages 865*a*, 865*b* of manifold 860.

Manifold 860 is further illustrated in FIGS. 12A-12C and FIGS. 13A-13D. As there shown, manifold 860 comprises a manifold body 880 with through holes 881 for receiving fasteners for mounting. Manifold 860 further includes a front end 882 and a first outer surface 883 with surface 883 including sealing rings or ridges configured as rectangular overlapping ridges 884*a*, 884*b*, where ridges 884*a*, 884*b* mate with grooves 891 in either of body 822*a* or 822*b* for sealing. Manifold 860 also includes a second outer surface 889 with surface 889 correspondingly including sealing rings or ridges configured as rectangular overlapping ridges 885*a*, 885*b*, where ridges 885*a*, 885*b* mate with grooves 891 in either of body 822*a* or 822*b* for sealing. A sealing material may be used to aid the sealing within grooves 891, such as an adhesive.

Manifold body 880 may also include locating pins 886 at each surface 883, 889 for aiding in positioning manifold body 880 to valve bodies 822*a*, 822*b*. Manifold passage 864 opens at the front end 882 and on both the first surface 883 within sealing ridge 884*a* and on the second surface 889 within sealing ridge 885*a*. Manifold passage 865*a* opens at the front end 882 and on the first surface 883 within sealing ridge 884*b*. Manifold passage 865*b* opens at the front end 882 and on the second surface 889 within sealing ridge 885*b*. In the illustrated embodiment, manifold passage 864 comprises an inlet passage and manifold passages 865*a*, 865*b* are thus outlet passages for the respective valve assemblies 820*a*, 820*b* for controlling flow in and out of manifold 860.

Manifold body 880 further includes a recess 887 at which seal 866 is positioned, where seal 866 may comprise a single seal with separate openings for each of passages 864, 865*a* and 865*b* at front end 882, or may comprise separate seals disposed about the openings. Manifold 860 further includes a back end 890. Although shown as including sealing ridges 884*a*, 884*b*, 885*a*, 885*b* an alternative manifold need not include such ridges.

Figure 14:
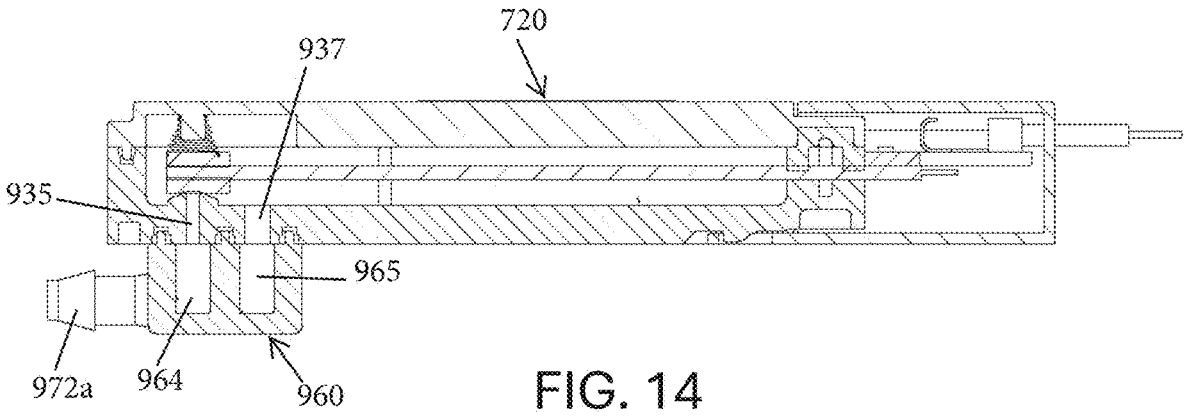
FIG. 14 is a cross sectional view of still another embodiment of a valve assembly in accordance with the present invention.
Figure 15B:
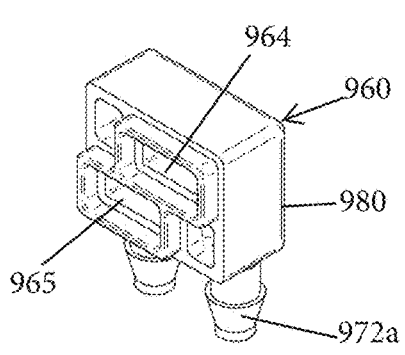
FIGS. 15A-15D are perspective views of the manifold adapter of FIG. 14 shown removed from the valve assembly.
Figure 15D:
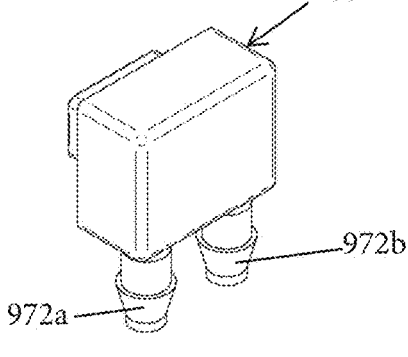
Figure 15A:
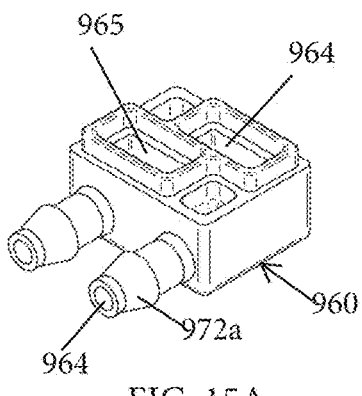
Figure 15C:
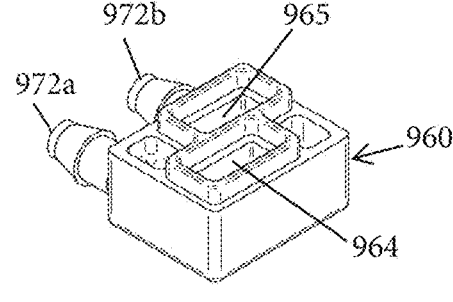

FIG. 14 discloses an alternative embodiment of the piezoelectric actuated valve assembly 720 discussed above in which an alternative manifold or manifold adapter 960 is provided that is further illustrated in FIGS. 15A-15C, where manifold 960 corresponds to manifold 360 and 560 discussed above, with similar features of manifold 960 being identified with similar reference numerals as used with manifold 560 but with 400 being added to the reference numerals relative to manifold 560.

Manifold 960 comprises a body 980 and includes a pair of barbs 972*a*, 972*b* to which hoses or fluid lines may be connected. Manifold 960 further includes passages 964, 965, where each of passages 964, 965 are in separate fluid communication with a given one of the barbs 972*a*, 972*b*, with passage 964 being in communication with barb 972*b* and passage 965 being in communication with barb 972*a*. Manifold includes a top surface 983 that includes sealing ridges 984*a*, 984*b*, where passage 964 opens on top surface 983 within sealing ridge 984*a* and passage 965 opens on top surface 983 within sealing ridge 984*b*.

When manifold 960 is mounted as shown in FIG. 14, passage 964 is aligned with passage 935 of body 922 and passage 965 is aligned with passage 937 of body 922. Passage 964 may be an inlet passage through which a fluid such as a gas may be allowed to selectively enter cavity 724 when pad 732 is lifted from port 734, with the gas then flowing out of cavity 724 through passage 737 of body 722 and out of passage 965 of manifold 960.

Manifold 960 comprises a moveable manifold that may be mounted as shown if FIG. 14 or rotated by 180 degrees whereby the passages 964, 965 of manifold 960 are instead aligned with passages 737, 735 of body 722, respectively.

Although various embodiments are shown employing a biasing member such as a spring. It should be appreciated that in an alternative arrangement a piezo assembly, such as anyone of assemblies 26, 126 or 226 may be installed so that it is over biased to thereby not require a spring. For example, the height of a seat upon which the associated sealing pad is intended to seal against may be made to be higher whereby when installed there is an as installed biasing of the sealing pad of the piezo assembly into sealing engagement.

Still other changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A valve assembly, said valve assembly comprising:
   a housing comprising a cavity and including a port forming an opening in said cavity;
   a manifold at said housing;
   a piezoelectric assembly disposed at least partially in said cavity;
   wherein said piezoelectric assembly comprises an elongated piezoelectric layer and comprises a sealing pad and an electrical contact, wherein said electrical contact is disposed outside of said cavity and is configured to receive a voltage signal, and wherein when said piezoelectric assembly receives a voltage signal at said electrical contact said piezoelectric layer deforms to cause said sealing pad to selectively seal or unseal said port;
   wherein said housing includes a first housing passage extending between said cavity and an outer surface of said housing, and wherein flow through said first housing passage is selectively enabled via said sealing pad selectively sealing or unsealing said port;
   wherein said manifold includes a first manifold passage aligned with a first manifold port, and wherein flow through said first manifold passage and said first manifold port is selectively enabled via said sealing pad selectively sealing or unsealing said port;
   wherein said manifold is disposed on said outer surface of said housing at said first housing passage and is selectively moveable relative to said housing, with said manifold being rotatable about an axis perpendicular to said outer surface to selectively orient said first manifold port relative to said housing.

2. The valve assembly of claim 1, wherein said piezoelectric assembly comprises a pair of opposed ends with said sealing pad disposed at one of said ends and said electrical contact disposed at the opposite of said ends.

3. The valve assembly of claim 2, further comprising a circuit board disposed within said housing with said circuit board in electrical communication with said electrical contact and configured for selectively applying a voltage signal to said electrical contact.

4. The valve assembly of claim 3, wherein the circuit board is mounted to said piezoelectric assembly.

5. The valve assembly of claim 4, wherein the circuit board comprises a resistor for damping said piezoelectric assembly.

6. The valve assembly of claim 1, wherein said housing includes a wall at least partially defining said cavity, and wherein said piezoelectric assembly extends through said wall such that said electrical contact of said piezoelectric assembly extends out of said cavity.

7. The valve assembly of claim 6, wherein said housing comprises a body and a cover.

8. The valve assembly of claim 7, wherein said housing further comprises an end cap disposed over said electrical contact of said piezoelectric assembly.

9. The valve assembly of claim 1, further comprising a biasing member engaged with said piezoelectric assembly to provide a biasing force to said piezoelectric assembly, and wherein when said piezoelectric assembly receives a voltage signal said piezoelectric assembly moves against the biasing force.

10. The valve assembly of claim 9, wherein said biasing member is configured to bias said piezoelectric assembly into a normally closed position in which said sealing pad is engaged with a seat at said port.

11. The valve assembly of claim 10, wherein said biasing member comprises a spring.

12. The valve assembly of claim 1, wherein said housing includes a second housing passage extending between said cavity and said outer surface of said housing, and wherein flow through said second housing passage is selectively enabled via said sealing pad selectively sealing or unsealing said port;

wherein said manifold includes a second manifold passage aligned with a second manifold port, and wherein flow through said second manifold passage and said second manifold port is selectively enabled via said sealing pad selectively sealing or unsealing said port; and wherein said manifold is disposed on said outer surface of said housing to be in fluid communication with said first and second housing passages, and wherein said manifold is rotatable about said outer surface to selectively orient said first and second port relative to said housing.

13. The valve assembly of claim 12, wherein in a first orientation of said manifold said first manifold passage is aligned with said first housing passage and said second manifold passage is aligned with said second housing passage, and wherein in a second orientation of said manifold said first manifold passage is aligned with said second housing passage and said second manifold passage is aligned with said first housing passage.

14. The valve assembly of claim 12, wherein said first manifold port and said second manifold port comprise barbs extending from said manifold.

15. The valve assembly of claim 1, wherein an o-ring is disposed between said manifold and said housing.

16. A valve assembly, said valve assembly comprising:
a housing comprising an outer surface and a cavity and including a port forming an opening in said cavity;
a manifold disposed at said outer surface of said housing, and wherein said manifold is selectively moveable relative to said housing, with said manifold being rotatable about an axis perpendicular to said outer surface to selectively orient said manifold relative to said housing;
a piezoelectric assembly disposed at least partially in said cavity;
wherein said piezoelectric assembly comprises an elongated piezoelectric layer and comprises a sealing pad and an electrical contact, wherein said electrical contact is disposed outside of said cavity and is configured to receive a voltage signal, and wherein when said piezoelectric assembly receives a voltage signal at said electrical contact said piezoelectric layer deforms to cause said sealing pad to selectively seal or unseal said port;
wherein said housing includes a first housing passage aligned with said port and extending between said cavity and said outer surface of said housing, and wherein said housing includes a second housing passage extending between said cavity and said outer surface of said housing;
wherein said manifold includes a first manifold passage in fluid communication with a first manifold port, and wherein said manifold includes a second manifold passage in fluid communication with a second manifold port;
wherein said first housing passage is aligned with and in fluid communication with said first manifold passage and said second housing passage is aligned with and in fluid communication with said second manifold passage;
wherein flow through said first manifold port and said second manifold port is selectively enabled via said sealing pad selectively sealing or unsealing said port; and
wherein said manifold is selectively moveable relative to said housing to selectively orient said first manifold port and said second manifold port relative to said housing.

17. The valve assembly of claim 16, wherein said first manifold port and said second manifold port comprise barbs extending from said manifold.

18. The valve assembly of claim 16, wherein in a first orientation of said manifold said first housing passage is aligned with and in fluid communication with said first manifold passage and said second housing passage is aligned with and in fluid communication with said second manifold passage, and wherein in a second orientation of said manifold said first housing passage is aligned with and in fluid communication with said second manifold passage and said second housing passage is aligned with and in fluid communication with said first manifold passage.

19. The valve assembly of claim 16, wherein said piezoelectric assembly comprises a pair of opposed ends with said sealing pad disposed at one of said ends and said electrical contact disposed at the opposite of said ends.

20. The valve assembly of claim 19, further comprising a circuit board disposed within said housing with said circuit board in electrical communication with said electrical contact and configured for selectively applying a voltage signal to said electrical contact.

* * * * *